United States Patent
Borg (12)

(10) Patent No.: US 6,380,976 B1
(45) Date of Patent: *Apr. 30, 2002

(54) DRIVE CIRCUIT WITH OVER-VOLTAGE PROTECTION FOR USE WITH PIXEL CELLS AND OTHER CIRCUITS

(75) Inventor: Matthew M. Borg, Corvallis, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,309

(22) Filed: Apr. 25, 2000

Related U.S. Application Data

(62) Division of application No. 09/203,789, filed on Dec. 1, 1998.

(51) Int. Cl.[7] .............................................. H04N 3/14
(52) U.S. Cl. ....................................................... 348/308
(58) Field of Search ................................. 348/308, 307; 361/91.1, 91.7; 327/143; 250/208.1

(56) References Cited

U.S. PATENT DOCUMENTS

| | | | | |
|---|---|---|---|---|
| 5,631,704 A | * | 5/1997 | Dickinson et al. | 348/308 |
| 5,654,858 A | * | 8/1997 | Martin et al. | 361/91.1 |
| 5,880,460 A | * | 3/1999 | Merrill | 348/308 |
| 5,900,623 A | * | 5/1999 | Tsang et al. | 348/308 |
| 5,929,672 A | * | 7/1999 | Mitani | 327/143 |
| 6,097,022 A | * | 8/2000 | Merrill et al. | 250/208.1 |
| 6,130,423 A | * | 10/2000 | Brehmer et al. | 348/308 |
| 6,147,846 A | * | 11/2000 | Borg | 361/91.1 |

* cited by examiner

*Primary Examiner*—Wendy R. Garber
*Assistant Examiner*—Luong Nguyen
(74) *Attorney, Agent, or Firm*—Pamela Lau Kee

(57) ABSTRACT

A drive circuit that produces an over-voltage signal and protects circuit components from the over-voltage signal (i.e., such that circuit components operate within process specification limits). A photosensitive pixel cell can be driven by the drive circuit. Use of the drive circuit increases dynamic range of the pixel cell and reduces "ghost images." Control logic selectively passes an over-voltage signal to individual rows of a 2-D pixel array.

18 Claims, 3 Drawing Sheets

US 6,380,976 B1

DRIVE CIRCUIT WITH OVER-VOLTAGE PROTECTION FOR USE WITH PIXEL CELLS AND OTHER CIRCUITS

CROSS REFERENCE TO RELATION APPLICATION

This is a divisional of copending application Ser. No. 09/203,789 filed on Dec. 1, 1998.

FIELD OF THE INVENTION

The present invention relates to drive circuits and, more specifically, to drive circuits with over-voltage protection that provide a voltage greater than a supply voltage. Such circuits are beneficial for pixel cells as discussed herein and for other uses where a greater than $V_{DD}$ (or $V_{CC}$) voltage is desired.

BACKGROUND OF THE INVENTION

Photosensitive or "pixel" cells and drive circuits for powering those cells are known in the art. A typical drive circuit consists of a conventional buffer that is capable of propagating to a pixel cell or other circuit a voltage level that is no higher than a logic high voltage level. In CMOS circuits this voltage high level is often $V_{DD}$. As discussed in more detail below, this limitation is disadvantageous in use with pixel cells and other types of circuits.

Referring to FIG. 1, a representative photosensitive cell 10 is shown. Cell 10 includes three transistors 12-14 (which are typically n-type field-effect transistors) and a light sensitive or "photo" diode 15. Transistors 12 and 13 are coupled to $V_{DD}$ and transistor 14 is coupled to the source of transistor 13. A row reset signal is applied to the gate of transistor 12 and a row select signal is applied to the gate of transistor 14.

In a typical mode of operation, the row reset line is asserted high to charge the parasitic capacitance of the reversed biased photo diode to a reset level. After diode output node 17 has stabilized, the row reset is pulled low, allowing photo induced charge carriers to discharge the photo diode at a rate proportional to the incident light intensity. After a specific exposure time, the row select line is asserted high allowing the voltage at node 17 to be sampled at the cell output node 19 (normally coupled to a column of pixel cell outputs), through source follower buffer transistor 13. The row reset signal is again asserted high and low to reset node 17 a second time. The reset level is sampled at output 19. The difference between the voltage level at output 19 after exposure to incident light and at a reset level is proportional to the incident light intensity.

The row reset signal is driven by a digital gate that limits the high level of row reset to $V_{DD}$ as this is typically the highest available supply voltage on a CMOS integrated circuit. While beneficial for some purposes, the use in a typical pixel cell of a row reset signal with a high level limited to $V_{DD}$ has disadvantageous aspects.

One disadvantageous aspect is that the dynamic range at output 18 is limited to a maximum of $V_{DD}$–(2× the NMOS threshold, Vtn). One Vtn is lost at transistor 12 and the other is lost at transistor 13. Thus, dynamic range for a 3.3V $V_{DD}$ cell is approximately 3.3–(2×0.8) or 1.7 to 0.4 (the turn-off voltage of a current source transistor coupled to pixel column output 19). This results in a typical dynamic range magnitude of 1.3V.

Another disadvantageous aspect is that the row reset signal must be held high for a relatively long time, on the order of 100 microseconds, before node 17 reaches its final settled voltage due to sub-threshold leakage currents at transistor 12 as that transistor approaches its cutoff state. Due to timing constraints, imaging systems may be forced to use a shorter reset interval. Shorter reset intervals can in turn result in a difference between the "before exposure" reset and the "after exposure" reset signal strengths. The net effect is a memory of the previous captured image which can either add to or subtract from the present captured image, giving the appearance of a positive or negative ghost image superimposed on the desired image.

SUMMARY OF THE INVENTION

Accordingly, it is an object of the present invention to provide a drive circuit that is capable of improving performance in a pixel cell or other circuit. It is another object of the present invention to provide a drive circuit that is capable of producing an output signal that is greater than a supply voltage and that provides suitable over-voltage protection.

Is also an object of the present invention to provide a drive circuit that increases dynamic range and that increases the rate at which stable states and reset levels are reached in a pixel cell.

These and related objects of the present invention are achieved by use of a drive circuit with over voltage protection for use with pixel cells and other circuits as described herein.

The use of such a drive circuit with a pixel cell permits the delivery of a higher voltage level reset signal to the row reset transistor of that cell. A first advantage of a higher row reset signal or gate voltage is that it allows the photo diode cathode (node 17) to be reset all the way to $V_{DD}$ without altering the pixel design, thus increasing the dynamic range of the cell by Vtn. This can be a dynamic range improvement approaching a factor of 2, depending on supply voltage level and process specifics like threshold dependence on back bias.

A second advantage is that since the cell reset transistor never approaches cutoff during reset, the diode output node charges to the reset level much faster. A third advantage is that because node 17 resets all the away to $V_{DD}$, the final reset level is not dependent upon the discharge level of the photo diode prior to the reset operation, thereby eliminating the occurrence of ghost images.

An additional advantage is that the higher reset level results in a stronger reverse bias on the photo diode, resulting in smaller parasitic depletion capacitance. The smaller capacitance results in higher sensitivity to photo generated charge carriers and potentially improves image quality in low lighting conditions.

In addition to use with pixel cells, the drive circuit of the present invention may be used in any application where the designer desires to use a non-complementary transmission gate for gating signals with large dynamic range. For example, the gate of an n-channel MOS device can be driven by a similar drive circuit to allow it to control transmission of signals approaching the positive supply. Such a function would otherwise require use of a p-channel MOS device in parallel with the n-channel device, with a complementary gating signal. Other possible applications for the drive circuit of the present invention include use in: (1) pad circuits which must interface with higher voltage technologies, (2) FPGA, (3) fuse circuits, (4) DRAM, (5) EEPROM, and (6) flash memory.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 1 is a block diagram of a typical photosensitive or pixel cell of the type used in an active pixel sensor device, such as a digital camera or scanner or the like.

DETAILED DESCRIPTION

Figure 2:
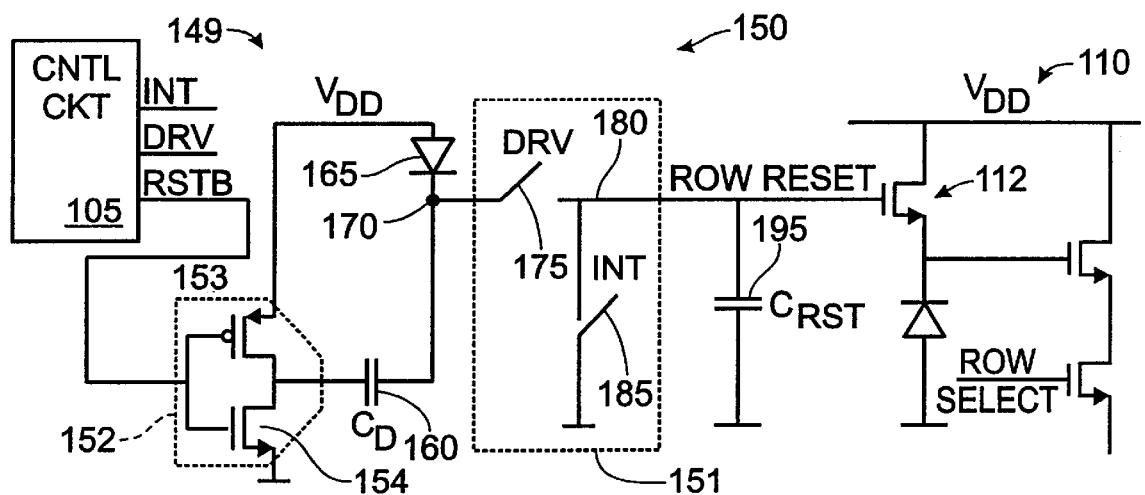
FIG. 2 is a diagram of a drive circuit and the pixel of FIG. 1 with which it may be used in accordance with the present invention.

Referring to FIG. 2, a block diagram of a drive circuit 150 coupled to a pixel cell 110 in accordance with the present invention is shown. Circuit 150 achieves a row reset signal that is increased in magnitude such that the dynamic range and response time of cell 110 are improved. Circuit 150 essentially comprises an over-voltage generation component 149 and an over-voltage protection and drive component 151.

Figure 1:
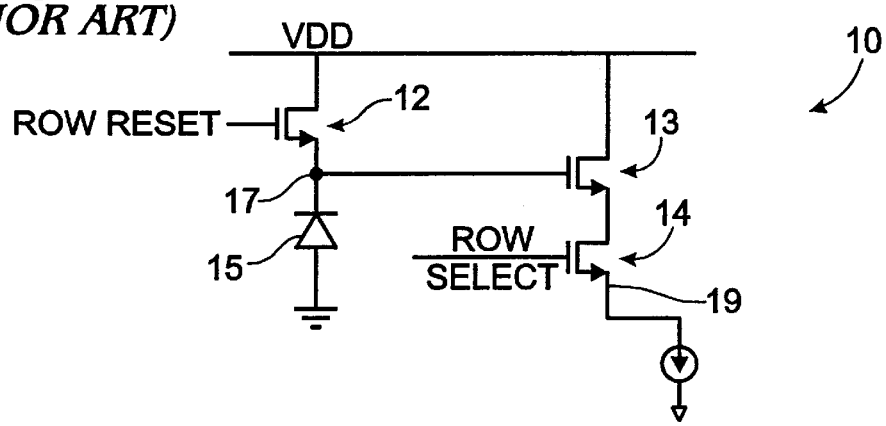

Circuit 150 includes a CMOS inverter 152 that comprises PMOS transistor 153 and NMOS transistor 154. The inverter is coupled is between $V_{DD}$ and ground and its output is coupled through capacitor 160 to node 170. Node 170 is also coupled through diode 165 to $V_{DD}$ and through switch 175 to the row reset signal line 180 that is in turn coupled to the gate of transistor 112 of cell 110 (which is analogous to transistor 12 of cell 10 of FIG. 1). An interrupt switch 185 and a capacitor 195 (indicative of the parasitic capacitance of the row reset signal line) are shown coupled between the row reset signal line and ground.

Figure 3:
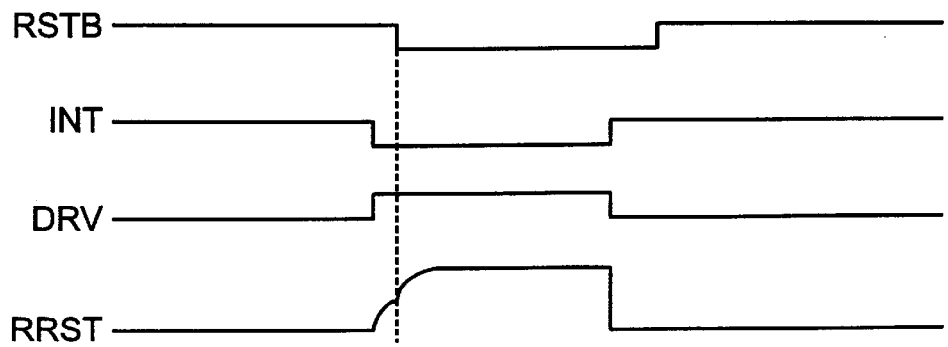
FIG. 3 is a timing diagram that illustrates operation of driver circuit 150 of FIG. 2 in accordance with the present invention.

Referring to FIG. 3, a timing diagram that illustrates operation of driver circuit 150 of FIG. 2 in accordance with the present invention is shown. The signal names abbreviations of FIG. 3 are as follows: RSTB=reset strobe; INT=interrupt reset signal; DRV=drive reset signal and RRST=row reset signal (delivered to the gate of transistors 12, 112).

Prior to a reset operation (defined by the transition from low to high and back to low again of the row reset signal), the drive capacitor 160 is charged, DRV switch 175 is open and RSTB is high (driving the output of inverter 154 low). As a reset operation begins, the voltage level at node 170 drops approximately 0.7V (one diode drop) below $V_{DD}$, DRV switch 175 is open, and the INT switch is closed, holding the row reset line low. The INT switch 185 is then opened while the DRV switch 175 is simultaneously closed. This causes the voltage on the row reset line to rise to an equalized voltage level determined by charge transfer from drive capacitor 160 to the parasitic capacitance 188. The intermediate row reset voltage level equals approximately $C_D * (V_{DD}-0.7)/(C_{RST}+C_D)$ The RSTB is then asserted (driven low) which raises the output of the inverter towards $V_{DD}$, which further drives the row reset signal to a level:

$$\text{Row Reset}=C_D * (2*V_{DD}-0.7)/(C_{RST}+C_D) \qquad \text{Eqn. 1}$$

Row reset is then pulled low again by opening DRV switch 175 and closing INT switch 185. The RSTB signal is subsequently driven high in preparation of the next row reset operation. It should be recognized that the size of $C_D$ is selected relative to $C_{RST}$ such that the high level of Row Reset (given by Eqn. 1) is at least 1 Vtn above $V_{DD}$. This way, the source of device 112 will pull up all the way to $V_{DD}$ during a reset interval.

It should also be recognized that the CMOS processes used to implement the above described circuit have specific limitations on maximum operating supply voltage in order to guarantee circuit reliability. The maximum supply voltage is typically about ten percent above an industry standard such as 5 volts or 3.3 volts. Provisions are often made, however, to interface between newer process technologies and older, higher voltage process technologies. This leads to special design rules for allowing higher voltages on an integrated circuit, typically confined to the pad rings, without compromising circuit reliability. These special design rules restrict the maximum voltage across any pair of FET device nodes to being less than the maximum rated supply voltage. Circuit design techniques should adhere to this restriction in realizing the above described circuit implementation. An exemplary circuit is now discussed.

Figure 4:
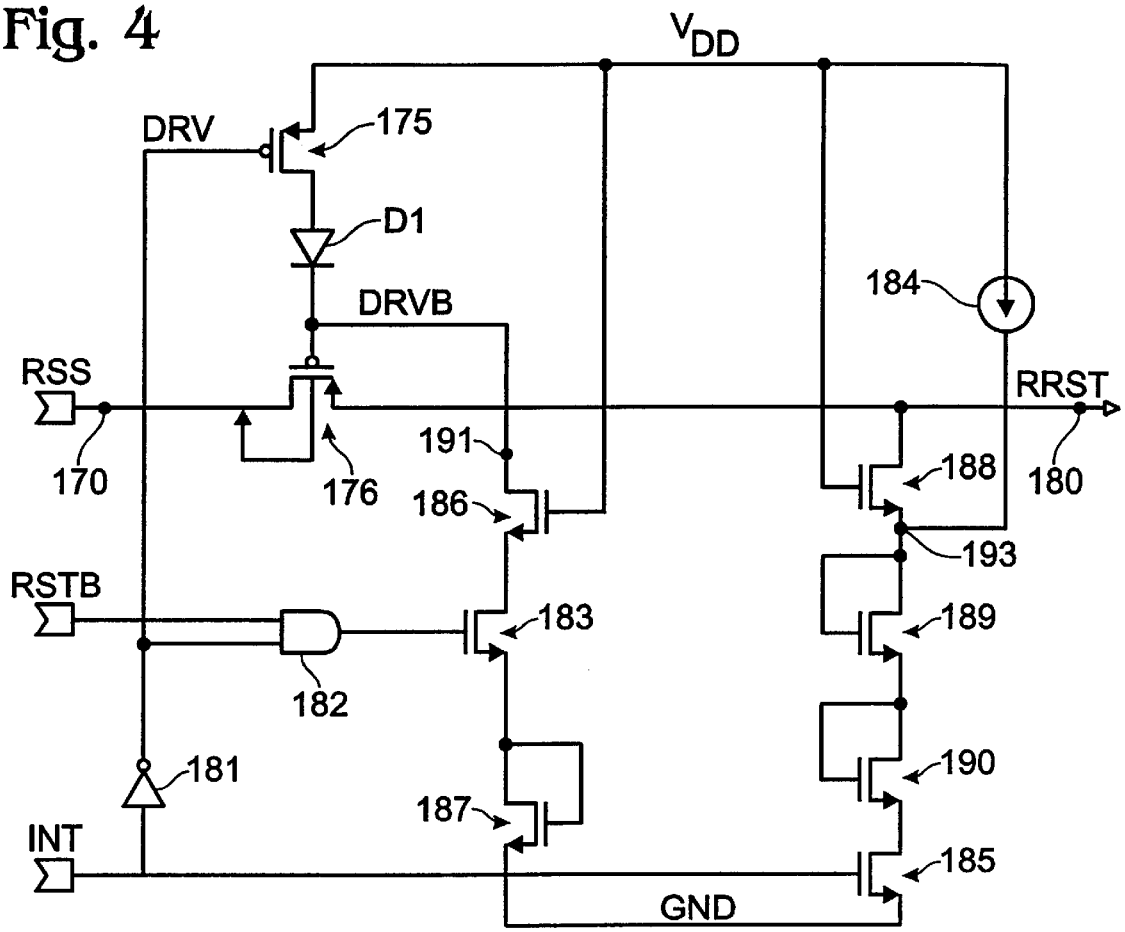
FIG. 4 is a schematic diagram that illustrates over-voltage protection circuitry for components of drive circuit 150 of FIG. 2 in accordance with the present invention.

Referring to FIG. 4, a schematic diagram illustrating drive circuit 151 including over-voltage protection in accordance with the present invention is shown.

Signals input to region 151 include RSTB, INT and the signal from node 170 (RSS), $V_{DD}$ and ground. DRV is generated internally by inversion of the INT signal which is propagated to transistor or INT switch 185 (FIG. 2). The DRV signal is generated by inverter 181 and delivered to PMOS transistor 175. The DRV signal is also gated with the RSTB signal and propagated to NMOS transistor 183. The RSS signal from node 170 is delivered to PMOS transistor 176. Circuit 151 also includes diode D1, a constant current source 184 and NMOS transistors 186–190 (note that transistors 187, 189 and 190 are effectively configured as diodes).

Devices that protect other devices from high voltage damage include diode D1 and transistors 186 and 188. The high voltage pulse generated at node 170 (RSS) is gated by transistor 176. If INT is low when the pulse arrives, then transistor 176 is turned on and the pulse passes through to the row reset line 180. If INT is high when the pulse arrives, then transistor 176 is turned off and the row reset signal is held low.

Figure 5:
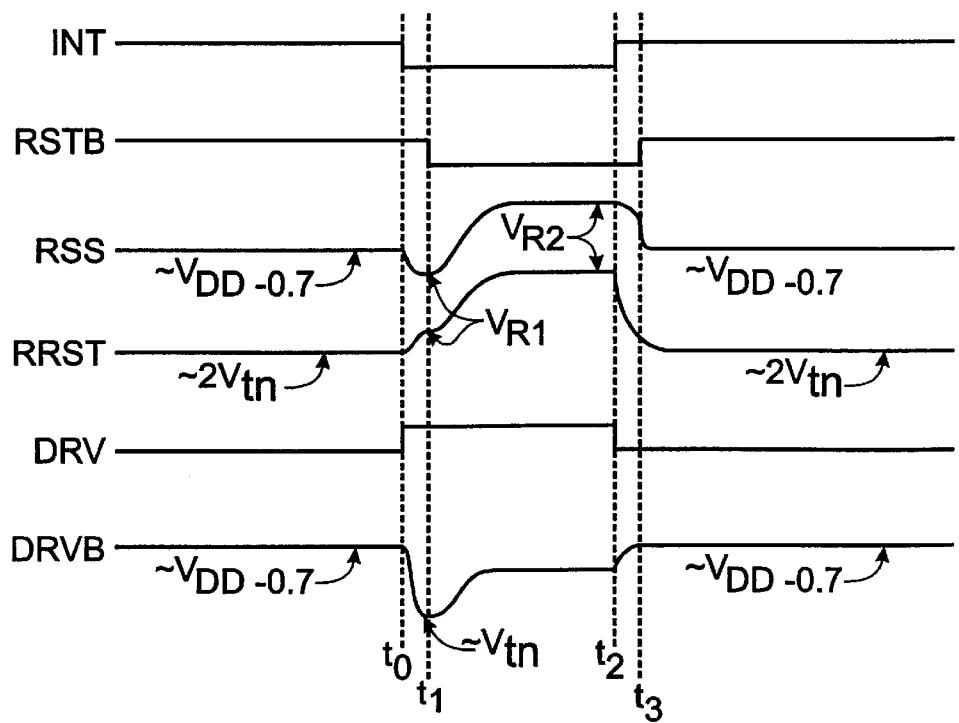
FIG. 5 is a timing diagram of a single row of an active pixel sensor array in accordance with the present invention.

Referring to FIG. 5, a timing diagram for operation of circuit 151 in accordance with the present invention is shown. The operation of circuit 151 is now described in conjunction with the timing diagram of FIG. 5.

Before time t0, INT and RSTB are high and RSS is stable at $V_{DD}$–a diode drop (approximately 0.7V). Since DRV is low, internal node 191 (signal DRVB) is stable at $V_{DD}$–0.7, holding transistor 176 in an off state. RRST is held at its low level which is defined by the trickle current from constant current source 184 driving diode connected devices 189 and 190. Constant current source 184 provides a very low current, such that the voltage across devices 189, 190 is approximately two n-channel thresholds (2Vtn).

At time t0, INT goes low, causing DRV to go high and turning off transistor 175. The output of AND gate 182 goes high, turning on transistor 183 which pulls DRVB down to one n-channel threshold above ground (i.e., transistors 183 and 186 are transmission gates, allowing diode connected device 187 to pull DRVB down until device 187 shuts off at one Vtn above ground). When DRVB is pulled low, transistor 176 turns on, shorting RSS and RRST together, allowing a transfer of charge from capacitor $C_D$ nto capacitance of the row reset line, $C_{RST}$. Since transistor or switch 185 is off, the row reset line is no longer coupled to ground and RRST and RSS settle to an intermediate state, Vr1, that is between 2Vtn and $V_{DD}$–0.7.

At time t1 (approximately 200 ns after t0), RSTB is driven low, forcing the output of AND gate 182 low, turning off transistor 183 and allowing DRVB to float. Simultaneously, the voltage at node 170 drives RSS and RRST (since transistor 176 is on) to a voltage Vr2 which is above $V_{DD}$ (if $C_D$ is sized correctly). As RSS rises, the parasitic capacitance between RSS and DRVB (the gate capacitance of transistor 176) pulls DRVB to a higher level such that the voltage across the gate of transistor 176 does not exceed process limitations, while keeping transistor 176 in the on state. It should be recognized that after DRVB is pulled low to turn transistor 176 on, DRVB is subsequently allowed to float, with transistors 175 and 183 both off such that DRVB follows RSS. While RRST is driven above VDD, transistor 188 buffers the devices connected to node 193 and below from the over-voltage condition. Transistor 188 itself does not experience excess gate oxide voltages since the gate is tied to $V_{DD}$.

At time t2 (approximately 300 ns after t1), INT is driven high which pulls DRV low, turning on transistor of switch 175 which in turn pulls DRVB up to $V_{DD}$–0.7 again, turning transistor 176 off. Simultaneously switch 185 turns on which pulls RRST back down to 2Vtn.

At time t3 (approximately 100 ns after t2), RSTB is driven high again, pulling RSS back down to $V_{DD}$–0.7.

In the case where the INT signal of a reset drive circuit is held high (so as to not pass the RSS pulse on to the row reset line) while RSTB is pulled low, transistor 183 remains turned off and DRVB is not pulled low, leaving transistor 176 turned off. Since RSTB is driven low, forcing RSS above $V_{DD}$, the parasitic capacitance between RSS and DRVB again causes DRVB to follow RSS. This action guarantees that transistor 176 stays turned off while RSS rises, isolating RRST from RSS such that RRST stays low (at 2Vtn). As DRVB is pulled higher, diode D1 becomes reverse bias, isolating transistor 188 from the excessive voltage of DRVB. In a similar fashion to the protection transistor 188 offers, transistor 186 now protects transistor 183 from the voltage at DRVB. While DRVB will exceed $V_{DD}$ during such a RSTB. interval, the gate-source voltage of transistor 176 does not exceed process specifications since the RRST low level is above ground by 2Vtn.

Figure 6:
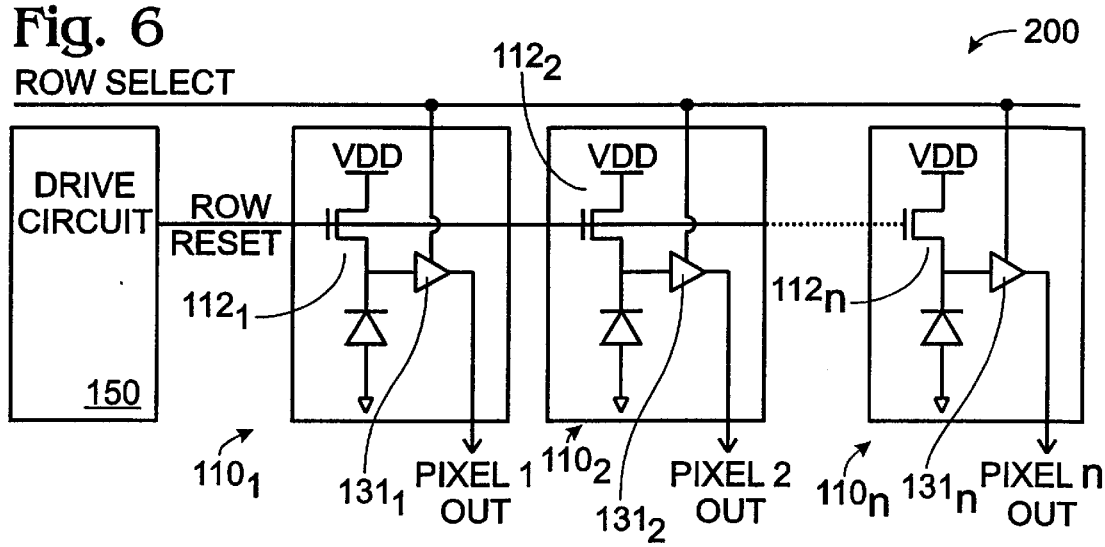
FIG. 6 is a schematic diagram of a representative active pixel sensor array utilizing the drive circuit of FIGS. 2 and 4 in accordance with the present invention.

Referring to FIG. 6, a schematic diagram of a representative active pixel sensor array 200 utilizing the drive circuit of FIGS. 2 and 4 in accordance with the present invention is shown. FIG. 6 illustrates drive circuit 150 coupled to a plurality of linearly arranged pixel cells $110_1$, $110_2$ and $110_n$.

The Row Reset signal is delivered from the drive circuit to the reset transistors $112_1$, $112_2$ and $112_n$ of each pixel cell. The pixel cells are analogous to pixel cells 10 and 110 discussed above. The Row Select 114 and source follower/buffer transistors 113 of cell 110 (FIG. 2) are shown as buffers $131_1$, $131_2$ and $131_n$, that are enabled by Row Select. Array 200 is representative of a row of a one-dimensional or two-dimensional array.

Figure 7:
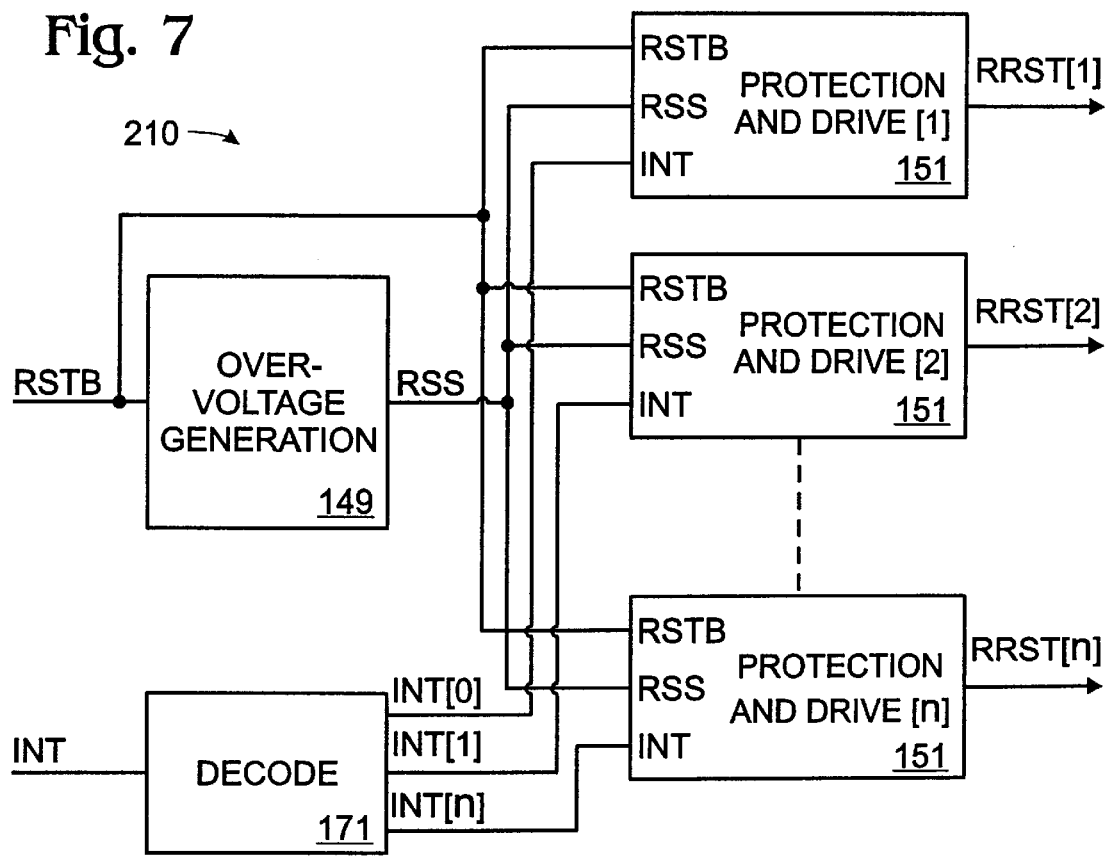
FIG. 7 is a schematic diagram of a circuit for generating a plurality of over-voltage drive signals in accordance with the present invention.

Referring to FIG. 7, a schematic diagram of a circuit 210 for generating a plurality of over-voltage drive signals in accordance with the present invention is shown. Circuit 210 includes an over-voltage generating component 149, discussed above, and a plurality of over-voltage protection and drive circuits 151.

Amongst other features, FIG. 7 illustrates that when it is desired to provide a plurality of over-voltage pulses where only one pulse is generated at a time, this can be achieved with a singular over-voltage generation circuit 149 and a plurality of over-voltage protection and drive circuits 151.

In a preferred embodiment, an over-voltage pulse is generated by generation circuit 149 and simultaneously delivered to the RSS input of each of the protection and drive circuits 151. While the over-voltage pulse is delivered to each of the protection and drive circuits, the decode logic 171 provides an active INT signal to only one of the plurality of protection and drive circuits. Only the protection and drive circuit whose INT signal is low will pass the pulse through to its RRST output. The RRST signals of the other protection and drive circuits will be held low.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A pixel cell arrangement, comprising:
   a pixel cell having a power and a ground conductor coupled thereto;
   a drive circuit coupled to said power and ground conductors and said pixel cell, including,
      a capacitor for storing supplemental voltage, and
      a circuit that adds the supplemental voltage and an input signal of Vdd or less to produce an over-voltage signal greater than VDD; and
      an over-voltage producing circuit including a gating device for selectively passing the over-voltage signal;
   the drive circuit providing to the pixel cell an enhanced control signal corresponding to the over-voltage signal.

2. The pixel cell arrangement of claim 1, wherein said enhanced control signal is the photo cell reset signal.

3. The pixel cell arrangement of claim 1, further comprising a plurality of pixel cells coupled to said drive circuit.

4. The pixel cell arrangement of claim 1, further comprising a plurality of pixel cells each coupled to said drive circuit; and
   control logic coupled to said drive circuit that delivers a uniquely timed enhanced control signal to each of said plurality of pixel cells.

5. The pixel cell arrangement of claim 1, wherein said power conductor voltage is $V_{DD}$.

6. The pixel cell arrangement of claim 1, further comprising:
   a plurality of pixel cells arranged in at least a first and second row of pixels;
   the drive circuit further includes,
      a plurality of protection circuits, each corresponding to one of the first and
      second rows,
   the over-voltage producing circuit and the plurality of protection circuits being configured so as to deliver a uniquely times enhanced control signal to each of the rows of pixels.

7. The pixel cell arrangement of claim 1, wherein the over-voltage producing circuit includes a plurality of transistors that are configured in such a manner as to substantially prevent an excess of process specification limits for said transistors when exposed to said enhanced control signal.

8. The apparatus of claim 1, wherein said pixel cell and said drive circuit are provided in a single substrate.

9. A pixel cell arrangement, comprising:
   a pixel cell coupled to a power supply voltage and ground; and
   a drive circuit coupled to the power supply voltage and ground and to said pixel cell, including,
      a capacitor for storing supplemental voltage,
      a circuit that adds the supplemental voltage and an input signal of Vdd or less to produce an over-voltage signal greater than VDD, and
   an over-voltage producing circuit including a gating device for selectively passing the over-voltage signal;
   wherein said drive circuit is capable of generating an over-voltage signal for said pixel cell that has a voltage level that is greater than that of said power supply voltage.

10. The pixel cell arrangement of claim 9, wherein said drive circuit includes a protection circuit that protects circuit components from said over-voltage signal.

11. The pixel cell arrangement of claim 10, including a gate device that selectively passes said over-voltage signal; and wherein said gate device has a bias voltage that floats relative to a magnitude of said over-voltage signal.

12. The pixel cell arrangement of claim 10, further comprising:
   a plurality of pixel cells arranged in a first and second row of pixel cells; and
   control logic that selectively propagates said over-voltage signal to each of said rows of pixel cells.

13. The pixel cell arrangement of claim 12, further comprising a plurality of protection circuits each corresponding to one of said rows of pixel cells.

14. The pixel cell arrangement of claim 9, wherein said power supply voltage is $V_{DD}$.

15. The pixel cell arrangement of claim 9, wherein said pixel cell and drive circuit are provided on a single substrate.

16. The photosensitive pixel cell arrangement, as defined in claim 1, wherein the gating device has a relatively floating bias voltage.

17. The photosensitive pixel cell arrangement, as defined in claim 16, wherein the floating bias voltage substantially follows the over-voltage signal.

18. The photosensitive pixel cell arrangement, as defined in claim 1, wherein a bias signal for the gating device has a magnitude that when present concurrently with the over-voltage signal at the gating device, does not exceed process specification limits for the gating device.

* * * * *